United States Patent [19]

Hunt et al.

[11] 3,999,301
[45] Dec. 28, 1976

[54] RETICLE-LENS SYSTEM

[75] Inventors: Robert E. Hunt, China Lake; Kenneth L. Moore, Ridgecrest, both of Calif.

[73] Assignee: The United States of America as represented by the Secretary of the Navy, Washington, D.C.

[22] Filed: July 24, 1975

[21] Appl. No.: 598,896

[52] U.S. Cl. .................. 33/297; 350/164; 428/209
[51] Int. Cl.² .......................... G02B 1/10
[58] Field of Search ............ 350/164, 314; 33/297; 427/264, 265, 266, 269, 270, 162, 164, 255, 248 E, 404; 428/195, 209, 210, 469; 96/38.3

[56] References Cited
UNITED STATES PATENTS

| | | | |
|---|---|---|---|
| 2,715,352 | 8/1955 | Jobe | 350/164 |
| 2,999,034 | 9/1961 | Heidenhain | 350/164 |
| 3,622,319 | 11/1971 | Sharp | 96/38.3 |

FOREIGN PATENTS OR APPLICATIONS 1,285,422   8/1972   United Kingdom ............... 96/38.3

*Primary Examiner*—James R. Hoffman
*Attorney, Agent, or Firm*—R. S. Sciascia; Roy Miller; Thomas W. Hennen

[57] ABSTRACT

A method of producing an optical reticle and the reticle produced thereby. A thin layer of aluminum is deposited on the face of a sapphire substrate and a reticle pattern is chemically etched therein. The system is then exposed to air at an elevated temperature for approximately one hour to oxidize the remaining aluminum layer. A film of titanium is next placed over the rough aluminum oxide as by sputtering, for example, and the excess titanium is etched away by the same pattern to produce the finished reticle.

2 Claims, 7 Drawing Figures

RETICLE-LENS SYSTEM

CROSS REFERENCE TO RELATED APPLICATION

This application pertains to an invention disclosed in assignee's co-pending application Ser. No. 599,254, filed July 25, 1975 and identified as Navy Case 56894.

BACKGROUND OF THE INVENTION

This invention relates to reticles employed in optical systems and particularly to reticles employed in infrared detector systems, and most particularly to a reticle-lens system which is effective in reducing back reflectance noise.

In a missile seeker system, for example, in which an infra-red detector is used as a guidance feature, a reticle is generally placed in the line of sight of the missile optics before the detecting circuitry. In prior reticles a problem existed when back reflectance in the reticle-lens system caused undesirable background noise.

SUMMARY OF THE INVENTION

According to the present invention, reflectance background noise is reduced to a minimum by successively depositing a thin layer of aluminum on the face of the sapphire reticle substrate, chemically etching a reticle pattern in the aluminum, oxidizing the remaining aluminum and, finally depositing a film of titanium on the aluminum oxide before etching the final reticle pattern.

DESCRIPTION AND OPERATION

Figure 1:
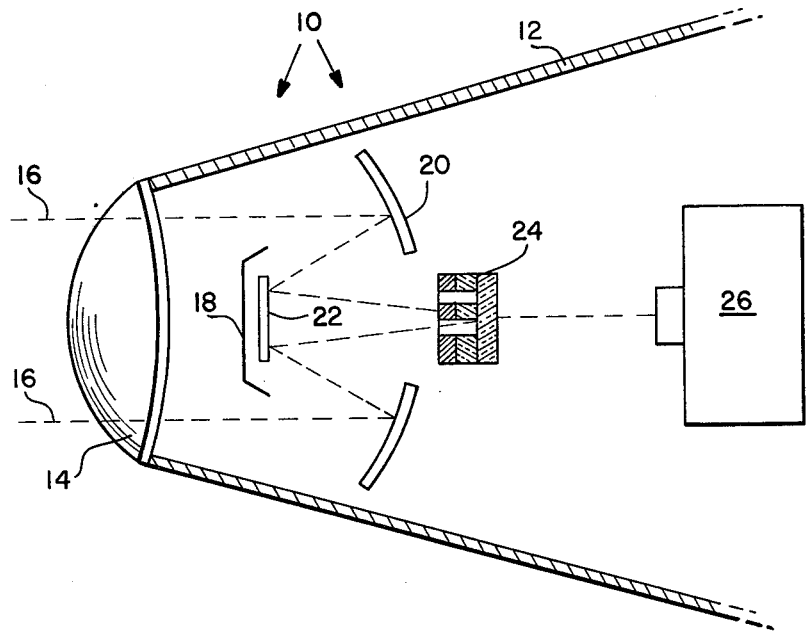
FIG. 1 is a schematic side elevation partly in section of a missile nose cone employing a reticle-lens system according to the present invention.

A typical guided missile nose cone is generally illustrated at 10 in FIG. 1. The tapered portion of the cone at 12 may be of metal or plastic and, in some applications, may be partially or totally transparent. A transparent window 14 is provided on the forward end of the missile for receiving radiation energy as indicated by dotted lines 16. A sun shield 18 is generally provided centrally of the optical path for obvious reasons and a plurality of optical surfaces 20, 22 are used to focus the received energy waves through a reticle 24 to a detector system 26.

Figure 2:
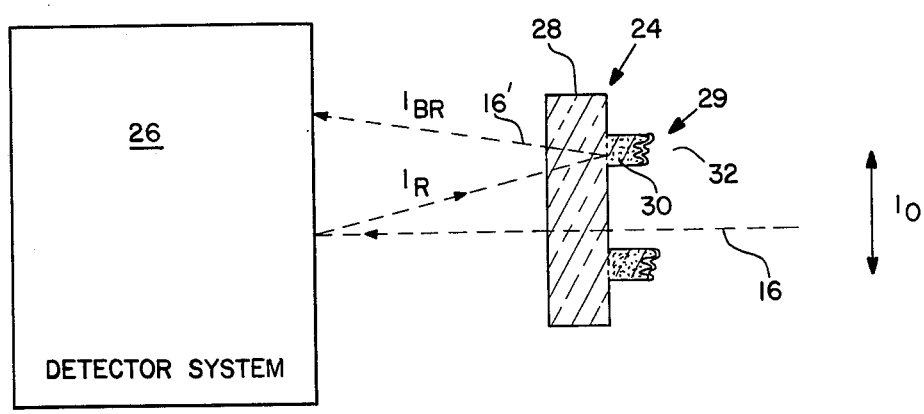
FIG. 2 is a schematic diagram of a portion of FIG. 1 illustrating details of the reticle-lens system.

As shown in FIG. 2, the reticle 24 is formed by a transparent substrate 28 having an opaque pattern 29 affixed thereto. In a known prior art device the pattern 29 consisted of a plating of titanium metal. According to the present invention the pattern 29 consists of a layer of aluminum oxide 30 overlayed by a film of titanium 32. When the energy waves from the target or source ($I_o$) travel along the path 16 to the detector system, a certain portion of the energy waves are reflected ($I_R$) and pass back through the reticle or are back reflected ($I_{BR}$) along path 16'. In prior art devices, for example, this back reflectance was on the order of 60 percent of $I_R$. This back reflectance, when received by the detector system, caused noise problems in the detector system. Reticles manufactured according to the present invention have been shown to decrease back reflectance in these systems by about 50 percent.

Figure 3:
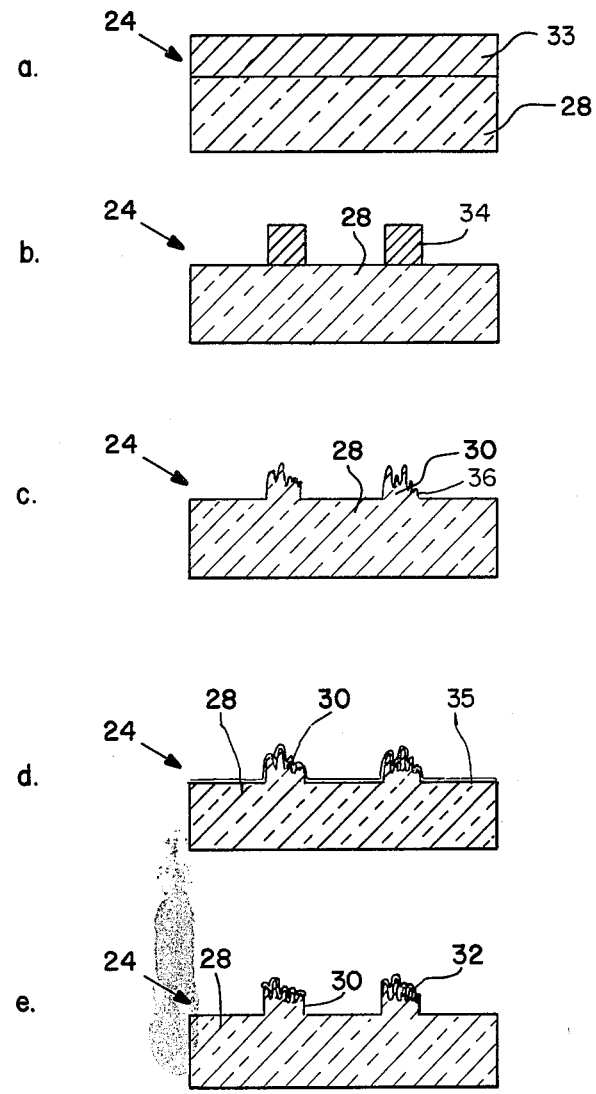
FIGS. 3A to 3E are cross-sectional views of the reticle system illustrating the steps in the process of manufacture.

FIGS. 3A through 3E illustrate a process by which the reticle of FIG. 2 may be manufactured. The sapphire substrate 28 is first coated with a thin layer of aluminum 33 as shown in FIG. 3A. Portions of the aluminum layer 33 are then etched away to form a reticle pattern 34 as shown in FIG. 3B. The reticle is then exposed to air at an elevated temperature (around 820° C) for about one hour to oxidize the remaining aluminum layer 33 so that it has a roughened surface 36 as shown in FIG. 3C. A titanium film 35 is next coated by sputtering, for example, over the rough aluminum oxide 30 as shown in FIG. 3D and finally the reticle pattern is etched into the titanium film 35 producing the finished reticle as indicated in FIG. 3E.

After the fabrication as set forth above, the entire reticle system is preferably coated with the usual anti-reflection coating of magnesium fluoride. The optimum thickness of this coating is λ/4 or one-fourth the optical wavelength of the radiation being received for processing by the detector system.

Obviously any number of modifications and variations of the present invention are possible within the teachings of the above disclosure. It is, therefore, to be understood that, within the scope of the appended claims, the invention may be practiced otherwise than as specifically described.

What is claimed is:

1. A reticle for use in a radiant energy detection system, said reticle comprising:
    a transparent substrate;
    a patterned layer of aluminum oxide overlying said substrate, said patterned layer having a rough surface; and
    an opaque film of titanium overlying said patterned layer of aluminum oxide and contacting said rough surface.

2. The reticle of claim 1 wherein said transparent substrate comprises sapphire.

* * * * *